United States Patent Office 3,148,190
Patented Sept. 8, 1964

3,148,190
TRIETHYLENEDIAMINE PRODUCTION
Ronald W. Swanson, Broomall, Pa., assignor to Air Products and Chemicals, Inc., Philadelphia, Pa., a corporation of Delaware
No Drawing. Filed May 17, 1962, Ser. No. 195,384
3 Claims. (Cl. 260—268)

This invention relates to the preparation of triethylenediamine-type of compounds corresponding to the formula $N(CHRCHR)_3N$ in which each R is hydrogen or methyl and characterized by a cage structure having at each of the two apexes a nitrogen atom, there being between the nitrogen atoms 3 chains of 2 carbons each.

Methods for the manufacture of triethylenediamine have been described in previous patents including Herrick, 2,937,176, Farkas et al., 2,977,363, and Krause, 2,985,658. Such previous methods have generally recommended the manufacture of triethylenediamine from a relatively pure starting material and the vapor phase conversion of the compound over a solid sorptive catalyst having cracking activity at an elevated temperature such as from 300 to 500° C.

In accordance with the present invention a triethylenediamine-type of compound is prepared by directing through a catalytic reaction zone at 250–500° C. a vapor stream containing several mols of ammonia per mol of residual amine, the amine vapors consisting of a wide-boiling mixture of several amines. The wide-boiling mixture of several amines may be a residuum resulting as a by-product from the manufacture of lower boiling amines. The use of a residual amine as the starting material is advantageous because the cost per pound is less than for some pure amines. Hence, it is feasible to reduce production costs for triethylenediamine even when the yield is slightly less than during the preparation from certain pure compounds. Surprisingly, the yields produced under industrial conditions are measurably higher for the residual amine mixtures than for certain of the pure compounds (e.g., diethylenetriamine) previously employed industrially. The boiling range of the residual amine must be at least 40° C., thus differing from the much narrower boiling range of technical grades of chemical compounds. The residual amine should have a wide-boiling range including a minimum boiling point of at least about 150° C. and an end boiling point not greater than about 400° C. If a crude material obtained as a by-product from the tonnage manufacture of a low-boiling (i.e., below about 250° C.) amine contains large amounts of ash components and/or components boiling significantly above 400° C., the crude material should be flash distilled to eliminate such non-distillable components and to provide a residual amine having a wide-boiling range which is not outside the 150–400° C. range.

The present invention is further clarified by several descriptions of preparations of triethylenediamine.

EXAMPLE I

An isothermal reactor included a vertical stainless steel tube about 135 cm. high and about 1.9 cm. inside diameter, surrounded by electric heating coils. Inert quartz granules filled the top and bottom of the tube and 162 ml. of kaolin catalyst granules filled a 55 cm. central portion of the tube. Vapors of the amine and ammonia could be fed to the top, and effluent withdrawn from the bottom of the tube. The amount of triethylenediamine (conveniently designated as TEDA or TED) in the effluent was analytically determined by a standard procedure. As a control, diethylenetriamine (conveniently designated as DETA) was converted both in the presence and absence of ammonia at 402° C. A residual amine designated as "Ethylene Amine P" and containing a variety of high boiling amines is also converted in the presence and absence of ammonia at 402° C. Data relating to these runs are shown in Table I.

Table I

|  | DETA | | Ethylene Amine P | |
|---|---|---|---|---|
| NH₃/amine | 0 | 5 | 0 | 5 |
| ° C. | 402 | 402 | 402 | 402 |
| Percent TED yield | 12.8 | 12.4 | 11.7 | 13.7 |
| Relative yield | 1.09 | 1.06 | 1.00 | 1.17 |

It should be noted that the presence of ammonia reduced the triethylenediamine (TEDA) yield by 3.1% when diethylenetriamine (DETA) was the feed. Surprisingly, the presence of ammonia increased the triethylenediamine yield by about 17% when Ethylene Amine P was the feed. The relatively slight change of using the residual amine (Ethylene Amine P) instead of diethylenetriamine at the same set of conditions including the presence of ammonia at 402° C. increased the yield of triethylenediamine from 12.4% to 13.7%, that is achieved a 10.5% increase. Ethylene Amine P is a residual amine containing TETA (triethylenetetramine) and several other amines of the formula:

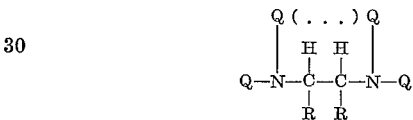

in which each Q or Q—Q is selected from the group consisting of hydrogen and organic groups containing atoms selected from the group consisting of C, H, O, and N, each carbon chain containing not more than 2 carbon atoms and each R is selected from hydrogen or methyl, said formula also being designated as $C_2H_2N_2R_2Q_4$.

EXAMPLE II

A residual amine known to contain significant amounts of TETA and hydroxyethylpiperazine and other amines of the $C_2H_2N_2R_2Q_4$ formula and having a wide boiling range from about 160° to about 360° C. has been marketed as "Amine AL–1." This residual amine was compared with Ethylene Amine P by runs at 400° C., 4 mols of ammonia per mol of amine (abbreviated as 4NH₃ amine), at 0.5 liquid volumes per volume of catalyst over kaolin catalyst, to obtain yields (percent by weight) as indicated.

|  | Triethylenediamine, percent | Piperazine, percent |
|---|---|---|
| Ethylene Amine P | 13.4 | 15.3 |
| Amine AL–1 | 14.4 | 7.6 |

Although a difference of 1% in yield appears trivial in some reactions there is commercial significance in the possibility of using about 7.3% less Amine AL–1 than Ethylene Amine P for making the same amount of triethylenediamine.

EXAMPLE III

A residual amine containing a variety of high boiling amines including TETA, and aminoethylpiperazine, and other amines of the $C_2H_2N_2R_2Q_4$ formula and marketed as Amine G–100 was employed to make triethylenediamine at a space rate of 0.2 volumes of amine per volume of kaolin cracking catalyst per hour using 5 mols of ammonia per mol of amine in a series of adiabatic reactors having a peak temperature of about 402° C. Inasmuch as the effluent contained triethylenediamine constituting 24% of the feed, the Amine G–100 was shown to be an interesting feedstock.

EXAMPLE IV

A residual amine containing N-aminoethyleneamine-ethylpiperazine

[H$_2$NCH$_2$CH$_2$NHCH$_2$CH$_2$N(CH$_2$CH$_2$)$_2$NH]

and TETA and other amines of the C$_2$H$_2$N$_2$R$_2$Q$_4$ formula is converted to triethylenediamine at the conditions set forth in connection with Example III, whereby a yield of 19% triethylenediamine is achieved.

EXAMPLE V

A mixture of residual amines, including each of the residual amines of the previous examples plus other by-products available from the manufacturers of technical grades of high boiling amines of the generic formula:

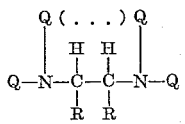

in which each Q or Q—Q is selected from the group consisting of hydrogen and organic groups consisting of atoms from the group consisting of C, H, O, and N, each chain of carbons having an effective length of two carbon atoms, and each R is selected from the group consisting of hydrogen and methyl, each of the by-product amine compounds also corresponding to said formula. In order to eliminate a small amount of contaminant boiling above 400° C., the mixture is flash distilled to remove such small amounts of ash and material boiling above 400° C. Preparation of triethylenediamine at the conditions set forth in the previous example provides a higher yield of triethylenediamine than provided by the use of pure diethylenetriamine.

EXAMPLE VI

A compound corresponding to 2-methyl triethylenediamine is prepared by cracking of a mixture of Ethylene Amine P and polypropylenediamine residual amine. By varying the proportions of the residual amines, the 2,2′ dimethyl derivative of triethylenediamine may be prepared. Similarly, use of residual amines resulting from the polymerization of 2,3-butylene imine permits the manufacture of the 2,3-dimethyl derivative. Inasmuch as the functions of the methyl groups or group is to lower the melting point to below room temperature, the hexamethyl derivative has been assumed to be of only theoretical interest and has never been prepared, nor have the pentamethyl or tetramethyl or trimethyl derivatives been prepared. In describing the compounds of proven utility, only the monomethyl and dimethyl derivatives are included, and can be designated by the formula

N(CHRCHR)$_3$N in which at least 4 of the 6 R's is hydrogen and each of the remaining 2 R's is selected from the group consisting of hydrogen and methyl.

Obviously many modifications and variations of the invention as hereinbefore set forth may be made without departing from the spirit and scope thereof, and therefore only such limitations should be imposed as are indicated in the appended claims.

What is claimed is:

1. In a methtod of manufacturing a triethylenediamine type of compound having a formula N(CHRCHR)$_3$N in which at least 4 of the 6 R's is hydrogen and each of the remaining 2 R's is selected from the group consisting of hydrogen and methyl by directing a reactant stream over a solid cracking catalyst at an elevated temperature to prepare an effluent containing a triethylenediamine type of compound, the improvement which consists of: employing as said reactant stream a mixture of ammonia and a residuum having a boiling point range of at least 40° C. attributable to the presence of a plurality of amine compounds in the residuum, the initial boiling point of the residuum being at least 150° C. and the end boiling point being not more than 400° C., said residuum resulting from the manufacture of amines structurally related to the herienafter described monomeric imine, said amines boiling below about 250° C., said residuum consisting essentially of several compounds resulting from the polymerization of an imine having a formula of:

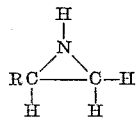

in which R is selected from the group consisting of hydrogen and methyl, said vapors of residuum being admixed with at least 2 but not more than 7 mols of ammonia per mol of amine, and said elevated temperature being maintained within the range from 300° C. to 500° C., whereby the effluent contains a significant amount of the triethylenediamine type of compound.

2. A method of manufacturing a triethylenediamine type of compound having a formula N(CHRCHR)$_3$N in which at least 4 of the 6 R's is hydrogen and each of the remaining 2 R's is selected from the group consisting of hydrogen and methyl, which method includes the steps of: directing a stream of the vapors of a normally liquid residuum consisting essentially of several compounds resulting from the polymerization of an imine having a formula of:

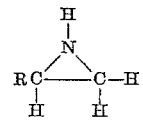

in which R is selected from the group consisting of hydrogen and methyl, said liquid residuum having a boiling range of at least 40° C. attributable to the presence of said several amine compounds in the residuum, the initial boiling point of the residuum being at least 150° C. and the end boiling point being not more than 400° C., and admixing the vapors of the residuum with at least 2 but not more than 7 mols of ammonia per mol of amine; and directing the mixture of predominantly ammonia and lesser amounts by volume of the vapor of residuum over a solid cracking catalyst at a temperature within the range from 300 to 500° C. to prepare an effluent containing a significant amount of triethylenediamine-type compound.

3. The method of claim 2 in which triethylenediamine is prepared by directing a residual amine structurally related to an imine in which R is hydrogen, together with about 5 mols of ammonia per mol of residual amine, over a sorptive kaolin cracking catalyst at a temperature not substantially exceeding 400° C. to prepare triethylenediamine.

References Cited in the file of this patent
UNITED STATES PATENTS

| | | |
|---|---|---|
| 2,303,075 | Frey | Nov. 24, 1942 |
| 2,937,176 | Herrick | May 17, 1960 |
| 2,977,363 | Farkas et al. | Mar 28, 1961 |
| 2,977,364 | Mascioli | Mar. 18, 1961 |
| 2,985,658 | Krause | May 23, 1961 |